3 Sheets—Sheet 1.
J. W. ELLS.
Manufacture of Hand-Rakes.
No. 226,051. Patented Mar. 30, 1880.
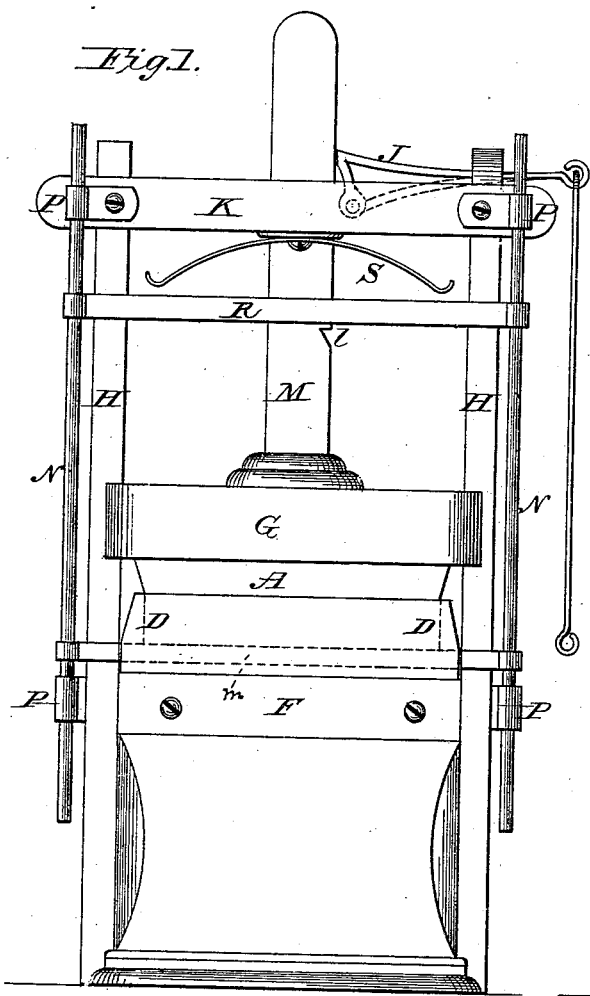
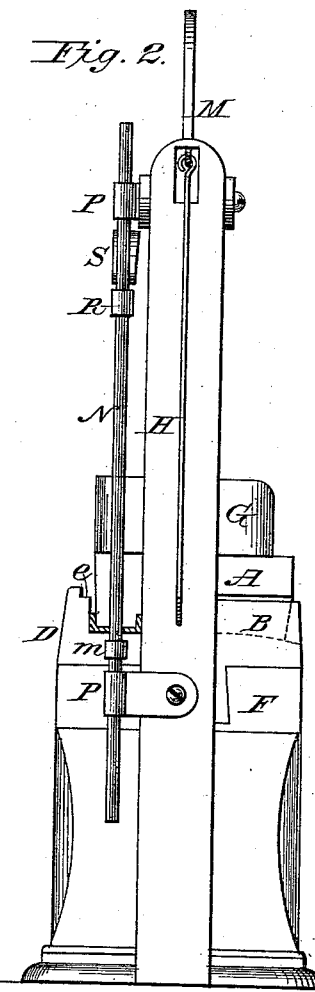
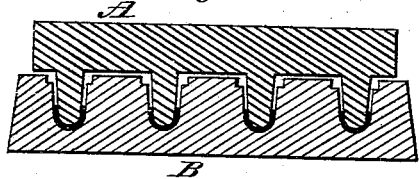
Witnesses:
Geo. C. Stewart
A. Price
Inventor:
Josiah W. Ells.

3 Sheets—Sheet 2.
J. W. ELLS.
Manufacture of Hand-Rakes.
No. 226,051. Patented Mar. 30, 1880.
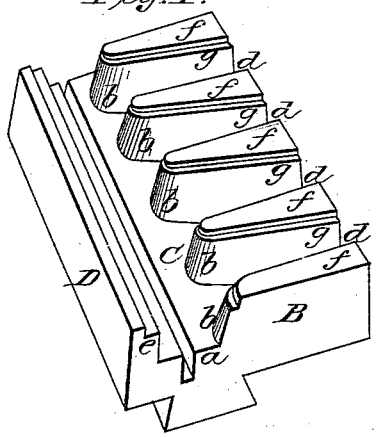
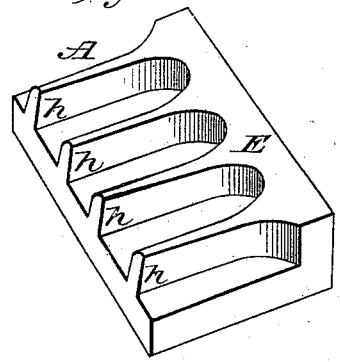
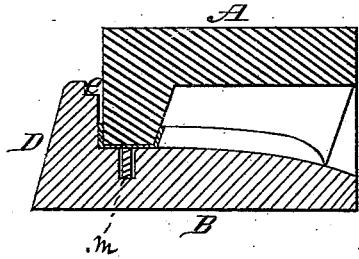
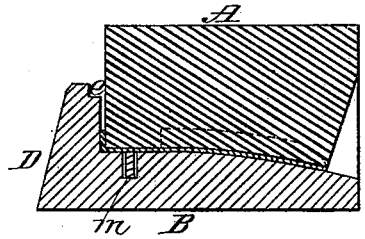
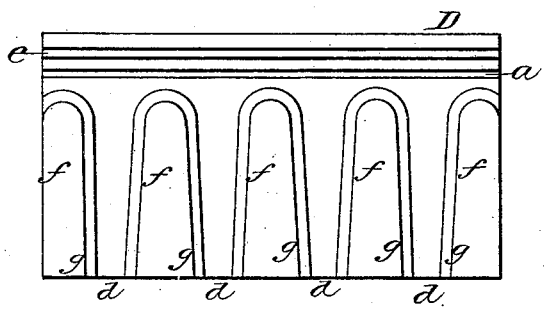
Witnesses:
Geo. C. Stewart
Al. Price
Inventor:
Josiah W Ells 3 Sheets—Sheet 3.
J. W. ELLS.
Manufacture of Hand-Rakes.
No. 226,051. Patented Mar. 30, 1880.
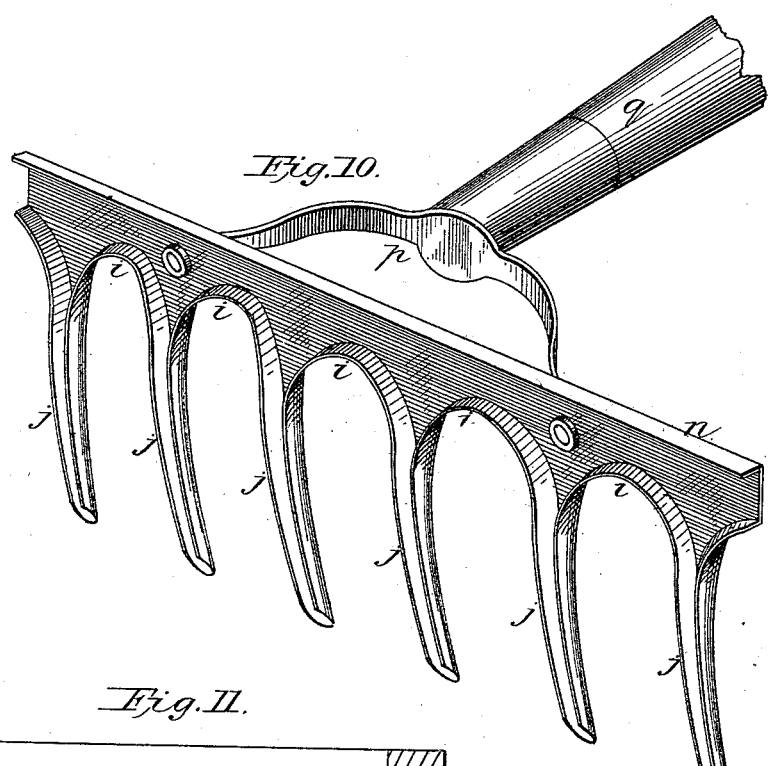
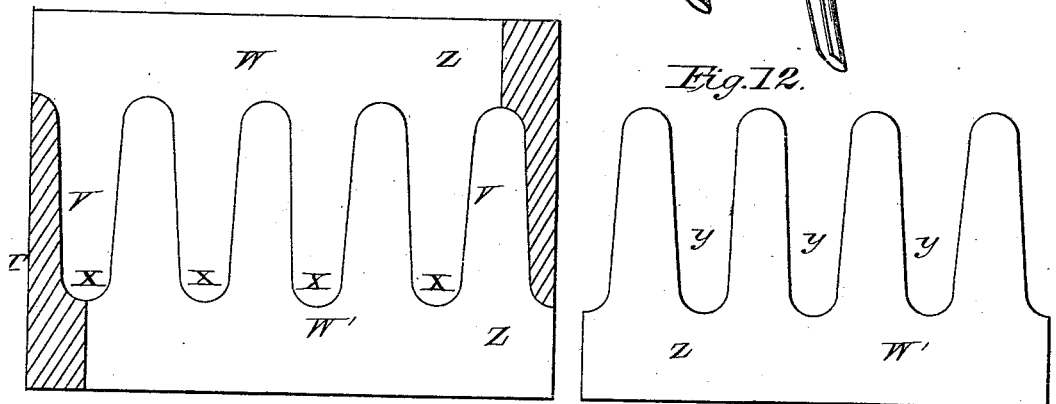
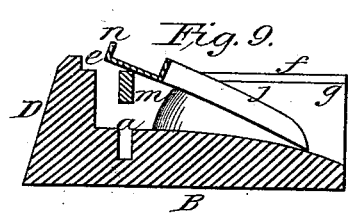
Witnesses:
Geo. C. Stewart
H. Price
Inventor:
Josiah W. Ells
N. PETERS, PHOTO-LITHOGRAPHER, WASHINGTON, D. C.

UNITED STATES PATENT OFFICE.

JOSIAH W. ELLS, OF PITTSBURG, PENNSYLVANIA, ASSIGNOR TO RICHARD E. BREED, OF SAME PLACE.

MANUFACTURE OF HAND-RAKES.

SPECIFICATION forming part of Letters Patent No. 226,051, dated March 30, 1880.

Application filed August 27, 1879.

*To all whom it may concern:*

Be it known that I, JOSIAH W. ELLS, of Pittsburg, in the county of Allegheny and State of Pennsylvania, have made new and useful Improvements in the Manufacture of Hand-Rakes, of which the following is a specification.

My invention will be readily understood from the following description, taken in connection with the accompanying drawings, wherein—

Figure 1 represents a front elevation of such an apparatus as I use for giving final form to the rake-head and its teeth in the manner hereinafter described; Fig. 2, a side elevation of the same; Fig. 3, a longitudinal vertical section of the teeth, forming portions of such dies as I use in making rakes; Fig. 4, a perspective view of the face of the lower die; Fig. 5, a similar view of the face of the upper die; Fig. 6, a transverse vertical section of both dies closed, and showing between them the end of a rake-head and the outside of one of its teeth; Fig. 7, a similar section of the same dies in a line drawn across the head of the rake and lengthwise through the center of one of its teeth; Fig. 8, a plan of the lower die; Fig. 9, a transverse section of the lower die, showing a rake as raised therefrom by the lifting-bar; Fig. 10, a perspective view of the back of one of my improved rakes, clearly showing the peculiarities of its construction. Fig. 11 represents a plate of thin sheet metal, with diagrams showing the outlines of the forms of the blanks, and Fig. 12 a blank as cut from said plate.

To make rakes in accordance with my invention I first construct a pair of heavy dies, A B, somewhat longer than the head of a rake, having fifteen or more teeth, and otherwise so proportioned as to accomplish the object for which they are intended.

That portion C of the lower die required to form the head of the rake is simply a long straight plane open at each end, and bounded on the outside by a wall, D, having along its entire upper inside edge a sudden step or depression, $e$.

Centrally located lengthwise of the plane C is a deep groove, $a$, and opposite the wall just mentioned, but transversely arranged, rise a series of separate round or conically-ended short walls, $b\ b\ b\ b\ b$, extending to the farthest side of the die, and gradually thickening or widening as they recede from the rounded portion, so as to constitute between them narrow channels, whose converging and sloping sides, as they approach each other, form tapering grooves $d\ d\ d\ d$ with concave bottoms curving downward in the direction of their length, which grooves correspond in number and shape to the teeth of a finished rake. Lengthwise on top of each of these short transverse walls, and forming part of the same, is a low flat wedge-shaped guide, $f$, rounded at their smallest ends, and not quite so long or wide as the transverse walls, thus leaving a marginal step or shoulder, $g$, along their sides and around their narrowest ends, otherwise conforming to the general outline of their support.

The upper or moving die, A, of the pair is constructed with a solid raised portion, E, along one side of its face corresponding in size to the inner portion of a rake-head, and of a length and depth equaling that of the straight wall along the front of the lower die, B. Joined to and branching out from one side of this straight raised portion E of the upper die are a number of curved ribs, $h\ h\ h\ h$, having rounded faces answering and conforming to the several spaces between the short walls $b$ on the face of the lower die, in which they are required to fit.

The face of the lower die, B, corresponds to the front or full portion of the rake, and is intended to give exact shape thereto, whereas the face of the upper or moving die bears a similar relation, and acts with the same respect to the back or concave portion of the implement, so that when the two dies A B are brought together face to face they constitute a mold, in which the sheet metal is formed into the head and teeth of a well-proportioned rake after the manner presently described.

The dies having been constructed as shown the lower one, B, of the pair is to be fitted to and securely fastened on an anvil, F, or heavy metallic block, enabling it, without moving, to sustain the violent shocks produced by the action of the upper die thereon, which upper die is in like manner made secure to the face of a drop or large moving hammer, G, so working in vertical guides H H as that it will, when required, properly fall upon the lower die with the greatest freedom and utmost precision.

It will be understood that the drop-hammer G and its die A are to be raised by steam or such means and mechanical devices as are generally used for purposes of like character. When lifted to such height that on falling therefrom it will give the most effective blow, the hammer and its attendant die will be held at that point of suspension by the pawl J, pivoted to the cross-beam K, which pawl is so operated by a spring as to catch in a notch, $l$, cut in the upright elevating-bar M for that purpose.

In the longitudinal groove $a$, along the face of the lower die, B, is placed a straight flat bar, $m$, edge up, whose projecting ends are rigidly connected each to a vertical rod, N, so fitted in proper guides P P, near the top and bottom, as to allow of a conjoint perpendicular and parallel movement therein. To these vertical rods N N, and at a point below the cross-beam K, is another horizontal bar, R, so arranged with respect to the lower bar, $m$, as that when the hammer G is about completing its upward movement it will come in contact with this upper bar, R, and lift it, thus imparting a similar movement to the rods N N, and be the means of raising the lower bar, $m$, out of and a short distance above its former position in the groove $a$.

A spring, S, is attached to the under side of the cross-beam K, and arranged directly in the path of the ascending upper horizontal bar, R, so that on its upward movement said spring shall be compressed and held in that condition as long as the hammer G is retained at the full height of its lift; but the moment the hammer is released the spring, acting on the liberated bar and rods, causes the lower horizontal bar, $m$, to enter its groove $a$ in the die B before the arrival of the hammer G, and so escape the bad results that would otherwise occur should the bar fail to enter the groove in proper time.

The dies and apparatus for operating the same having been constructed substantially in the manner shown and set forth, the next step toward the formation of rakes is the preparation of the blanks. Consequently a plate of thin metal, preferably sheet-steel, of proper length, breadth, and thickness, is subjected to the cutting action of such dies or shears as will at one operation divide the plate T on the diagram or zigzag line V V in such a manner that two blanks, W W', will be formed simultaneously out of a single piece of material, the teeth X of one blank being formed by the metal which was included in the spaces Y, between the teeth of the other, and regularly tapered their entire length and formed with rounded extremities and with rounded shoulders next that part Z reserved for the head of the rake. The semicircular form of the spaces at their deepest part and the proportionate distance between the teeth of the blank at that point is the only form that will enable the surrounding metal to be successfully brought to the shape of a curved flange at right angle, or nearly so, to the plane of the head and extending from tooth to tooth.

The gradual narrowing of the teeth of the blank gives the required taper to the teeth of a finished rake, and when bent to final form their rounded extremities produce such points as are easiest made and best adapted to this style of implement.

The cutting of the blanks out of a plain strip of metal in the manner shown and described gives such a form as greatly facilitates the process of finishing, and also enables them to be made with scarcely any waste of material, the only loss in cutting two blanks, however great the number of teeth, being that equal to half a tooth at each end of the plate, as indicated by the diagonal lines in Fig. 11.

To make a rake, the blank W' is to be brought to a uniform red heat, and while in that condition subjected to the action of the forming-dies by first raising the upper die, A, to its utmost limit, and then placing the flat blank on the face of the lower die, B, in such a manner as that the teeth of the blank will lie between the guides $f$ and directly over the transverse grooves, their edges resting upon the step or ledge around them, and so that each guide will fill its respective space Y in the blank and each tooth its space between the guides, their relative shapes being such as to correspond the one to the other, the taper of the guides $f$, with their rounded ends, exactly coinciding with the spaces between the teeth of a freshly-cut and unstamped blank, and such teeth filling in like manner the distance between the guides.

When the blank is properly seated on the die B its long straight edge $t$—that part most remote from the teeth—will rest in the step $e$ the sudden depression formed in the wall D on that side of the die, so that the whole blank will be supported in a horizontal plane above the concave portions of the die solely by its edges. When the blank is thus arranged on the face of the die, which operation requires but a moment of time, the drop G is to be released, and the upper die, A, descending therewith, instantly strikes the blank with a force sufficient to drive it into the concavities of the lower die, B, whereby the circular edges of the metal joining the base of the teeth with that portion of the blank intended for the head of the rake will be forced over and around the conical ends of the short transverse walls $b$, by which it will be given the form of a semicircular flange, $i$, reaching from one tooth, $j$, to the other, and the edges of the teeth will also be raised or turned up in the same proportion and slightly curved in the direction of their length.

The setting up of the circular flange lengthens the teeth to that extent, and the spaces between them are correspondingly widened, the distance being gradually increased in approaching the points by reason of the tapering form of the teeth. The upper straight edge of the head, by the same operation, is also turned up, forming an unbroken flange, n, from end to end.

On the elevation of the drop G and its attendant upper die, A, the stamped rake will remain in the lower die, B, until the drop reaches that point where it comes in contact with the upper cross-bar, R, and as the drop continues to ascend, it will raise that bar, and, by means of the connecting-rods N N, bring the lower bar, m, with it to the extent of lifting the rake out of its matrix, when it may be removed, leaving the dies free for the stamping of other blanks and the formation of additional rakes.

The blank, after having undergone the operation of the dies, presents the appearance of a nicely-formed rake, Fig. 10, having a strengthening and stiffening flange, n, along the upper straight part of the head, and with an equally deep circular flange, i, between each of the teeth, curving from one tooth to the other, and extending down the sides of the teeth to their terminal points, giving them the best possible shape consistent with this character of implement. Thus, by the peculiar formation of the blanks and the conjoint action of the dies thereon, a rake is made consisting of a straight flanged head having hollow, tapering, curved, and pointed teeth integral therewith.

To prepare these rakes for use a handle becomes necessary, and, for the purpose of attaching a handle, two or more small holes are punched through the head of the rake, and a forked tang, p, riveted thereto, by which the handle q may be secured after the manner usual in such cases.

Although I have shown a blank having only four teeth and suitable dies for stamping the same into final shape, by a mere enlargement or shortening of the parts in the direction of their length a rake may be constructed having any number of teeth—from two to the full limit of the dies.

Having thus described my invention, I claim—

1. In the manufacture of sheet-metal hand-rakes, the dies A and B, as shown in Figs. 5 and 4, respectively, jointly, as and for the purposes set forth.

2. The blank shown in Fig. 12, as and for the purposes set forth.

JOSIAH W. ELLS.

Witnesses:
GEO. C. STEWART,
AL. PRICE.